United States Patent [19]
Furuya

[11] Patent Number: 5,630,040
[45] Date of Patent: May 13, 1997

[54] EDIT SCREEN DISPLAY CONTROL DEVICE TO CONFIRM DATA LAYOUT WITHOUT SWITCHING TO SCREEN SHOWING ENTIRE LAYOUT

[75] Inventor: Satoshi Furuya, Kawasaki, Japan

[73] Assignee: Fujitsu Limited, Kawasaki, Japan

[21] Appl. No.: 598,132

[22] Filed: Feb. 7, 1996

Related U.S. Application Data

[63] Continuation of Ser. No. 285,430, Aug. 4, 1994, abandoned.

[30]  Foreign Application Priority Data

Aug. 13, 1993  [JP]  Japan ..................................... 5-201510
Jul. 28, 1994  [JP]  Japan ..................................... 6-176607

[51] Int. Cl.$^6$ ..................................................... G06T 11/00
[52] U.S. Cl. ............................ 395/139; 395/133; 395/326
[58] Field of Search ..................................... 395/139, 118, 395/128, 133, 134, 145–149, 153, 155–161

[56]  References Cited

U.S. PATENT DOCUMENTS 5,051,927  9/1991  Tada et al. .............................. 395/139
5,199,102  3/1993  Sakuragi ................................. 395/139

FOREIGN PATENT DOCUMENTS 1-76274  3/1989  Japan .
4-215121  8/1992  Japan .

Primary Examiner—Almis R. Jankus
Attorney, Agent, or Firm—Staas & Halsey

[57]  ABSTRACT

An edit screen display control device allows an operator to confirm a layout of data during an editing process on an edit screen without switching to a layout screen showing an entire screen. It also realizes an editing efficiently using a given area without reducing the amount of information displayed on the edit screen. When graphics are edited on the edit screen of the display, the graphics on the edit screen are automatically enlarged/reduced in accordance with the movement, change, deletion, etc. of the graphics to be edited on the edit screen so that the entire edit area can be displayed and a layout process is prioritized in the editing process.

12 Claims, 17 Drawing Sheets

SELECTING LAYOUT DISPLAY ⇒
⇐ RETURNING TO EDIT SCREEN

PRIOR ART

SELECTING LAYOUT DISPLAY ⇧ ⇩ RETURNING TO EDIT SCREEN

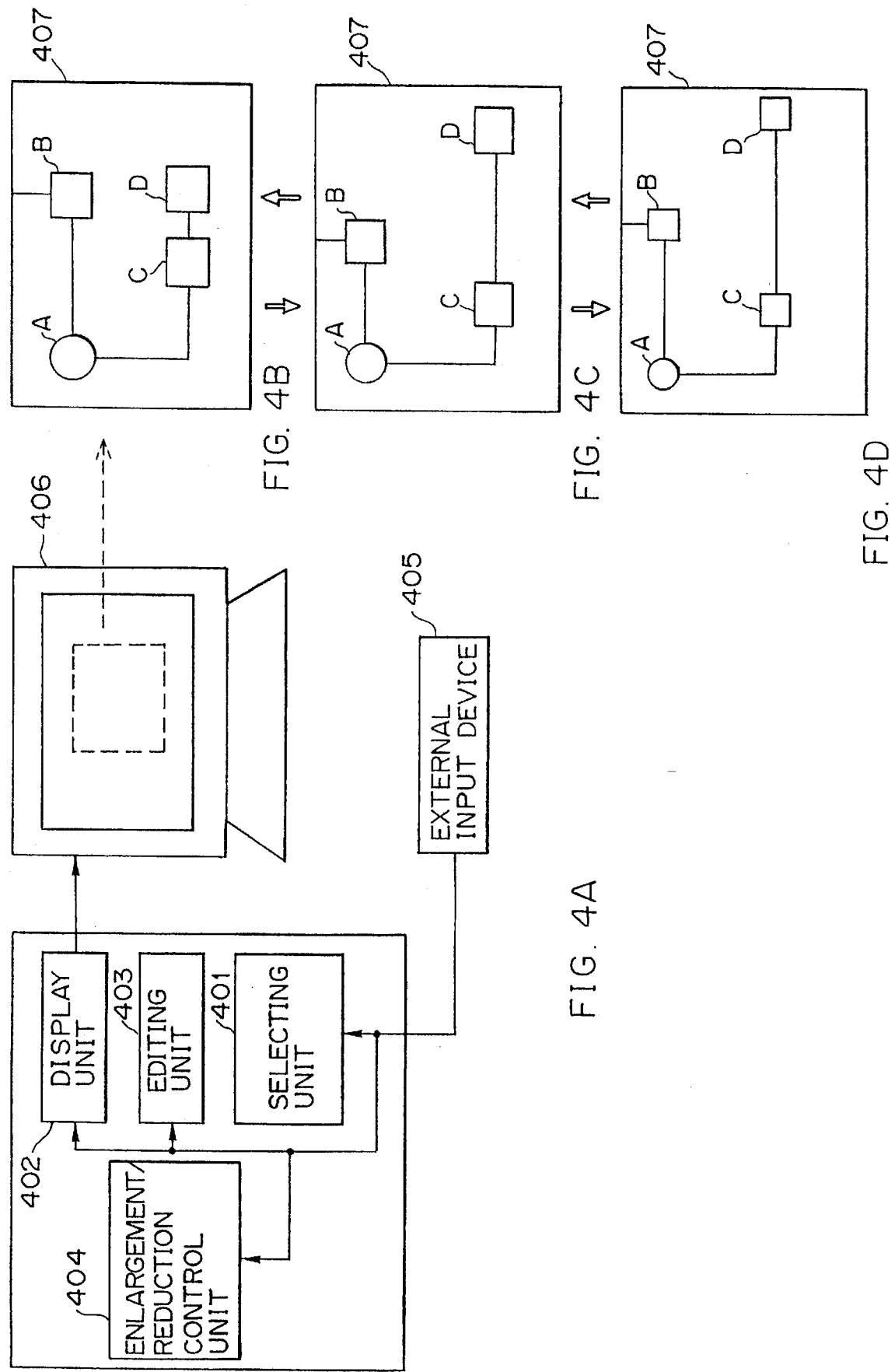

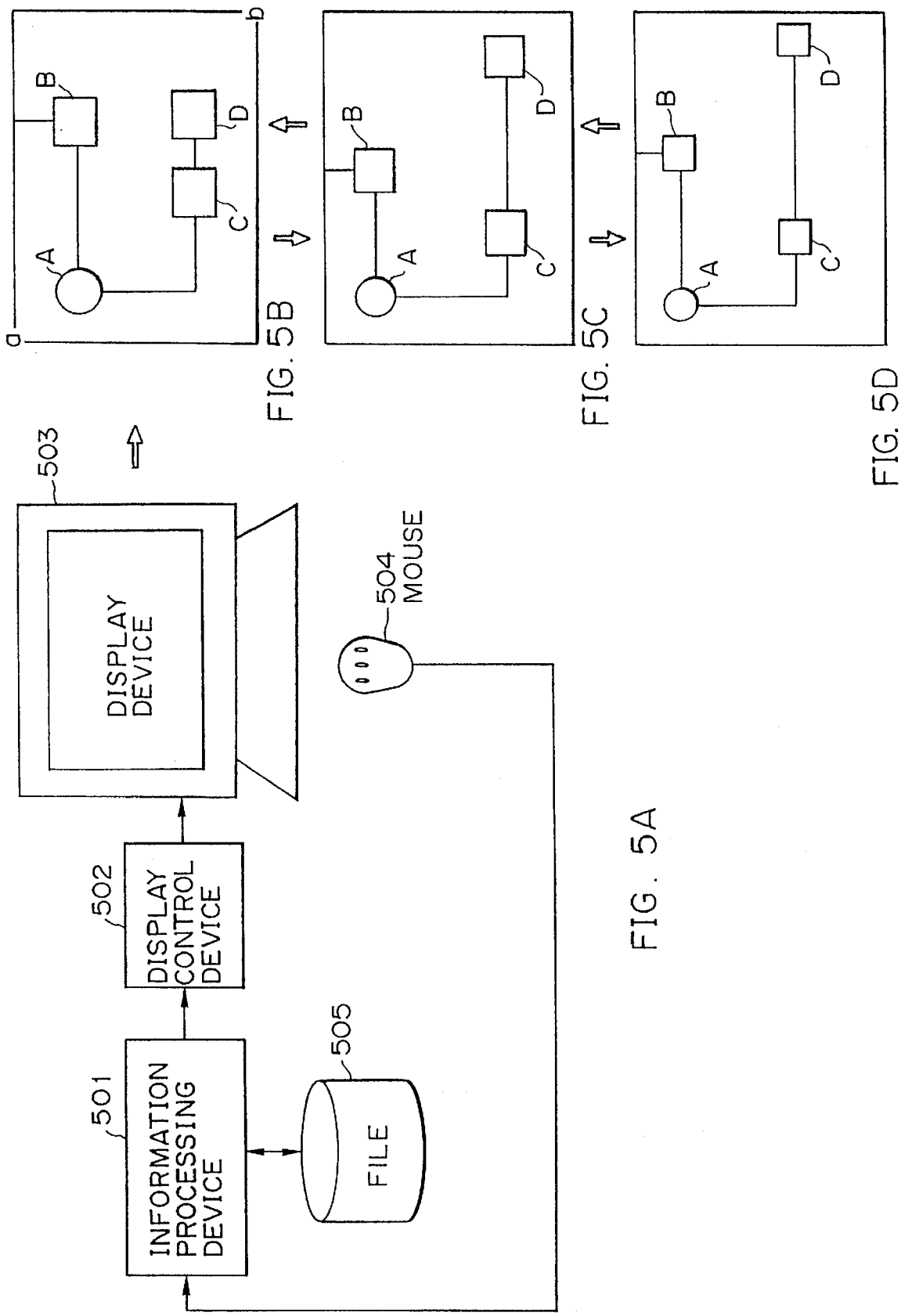

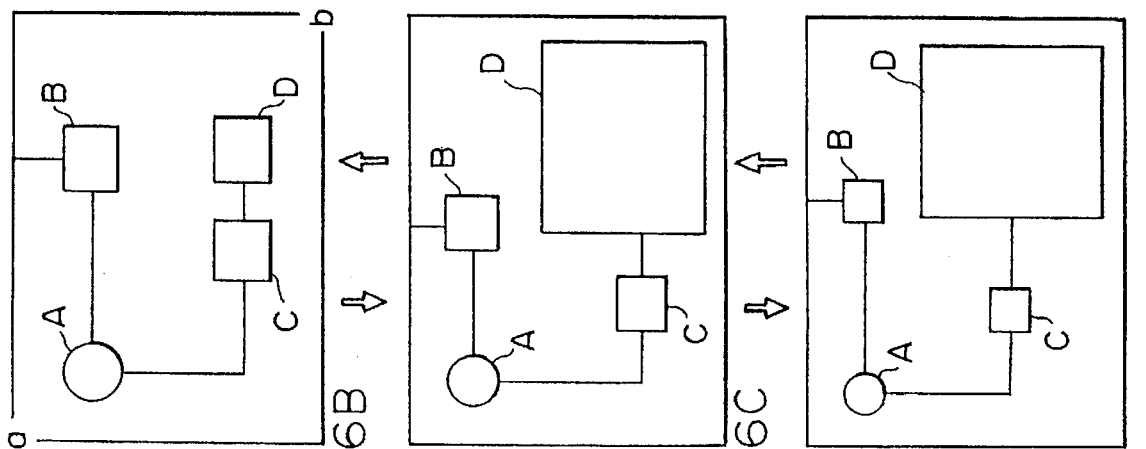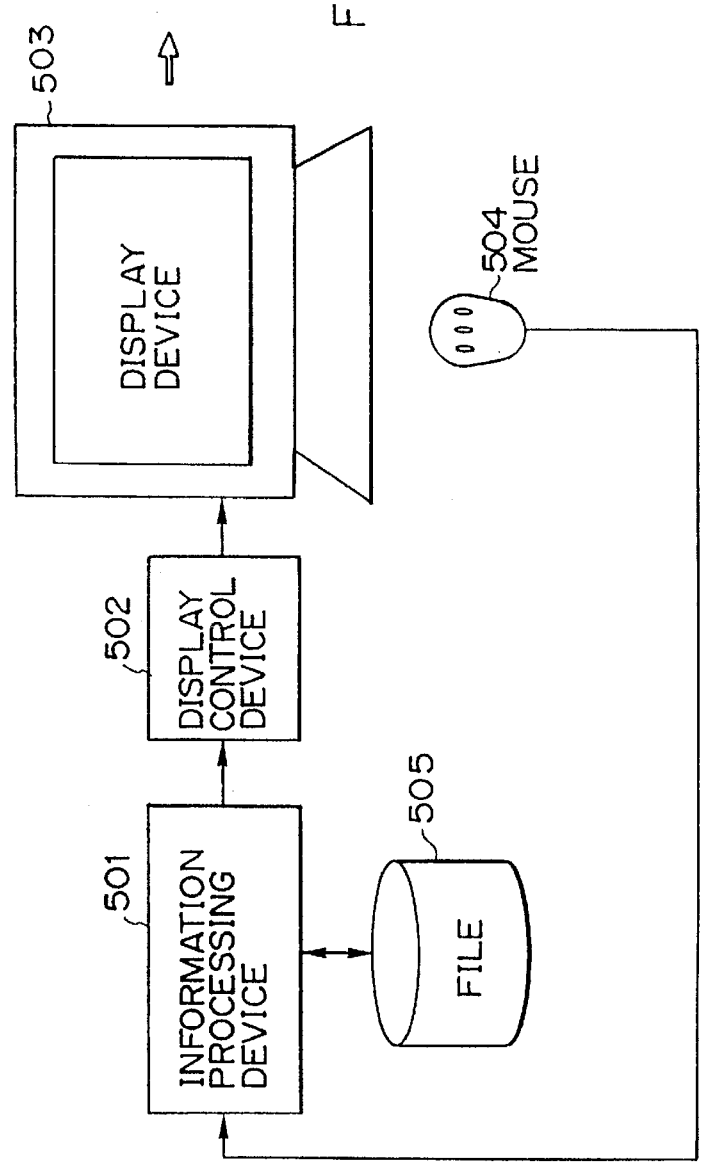

EDIT SCREEN DISPLAY CONTROL DEVICE TO CONFIRM DATA LAYOUT WITHOUT SWITCHING TO SCREEN SHOWING ENTIRE LAYOUT

This application is a continuation of application Ser. No. 08/285,430, filed Aug. 4, 1994, now abandoned.

BACKGROUND OF THE INVENTION

1. Field of the Invention

The present invention relates to a device for controlling a display of graphics, etc. in an edit screen when the graphics or characters, etc. are edited on an edit screen.

2. Description of the Related Art

When an editor (for example, a computer aided design (CAD), word-processor, etc.) for processing graphics and characters is used, the configuration of the graphics and characters becomes more complicated with an increasing amount of information on the screen, and the graphics and characters must be properly arranged in subsequent ability sessions.

To prevent this, the edit area should be entirely displayed for the purpose of editing data with their layout prioritized.

Conventionally, the following methods 1 and 2 have been used to arrange the layout of graphics and characters when operating an editor of graphics and characters.

1. Prior Art (1)

FIGS. 1A and 1B show the display screen according to the first prior art. FIG. 1A shows an edit screen 101 which is a part of an entire layout screen. If an editing operation on the graphics in the edit screen 101 is suspended to display the entire layout, then a layout screen 102, that is, the entire layout of the graphics being edited, replaces the edit screen by selecting layout display capabilities. FIG. 1B shows the layout screen 102 for displaying the entire layout.

An operator refers to the layout screen 102 shown in FIG. 1B to confirm the entire layout, and switches from the layout screen to the edit screen 101 shown in FIG. 1A to start an editing operation. If the operator requests to switch an edit area, he can specify another edit area with the layout screen 102 displayed, and switch to the edit screen 101. Repeating the above described operations allows the operator to complete his or her editing operation.

2. Prior Art (2)

FIGS. 2A and 2B show the two windows open on the screen according to the second prior art. The two windows are assigned an edit screen 201 and a layout screen 202 respectively. FIG. 2A shows the window displaying the edit screen 201, that is, a part of the layout screen, which overlaps the window displaying the layout screen 202. If a graphic editing operation is suspended on the edit screen 201 to display the entire layout, then the operator switches screens such that the window displaying the layout screen 202 overlaps the window displaying the edit screen 201 as shown in FIG. 2B to enable reference to the entire layout on the layout screen 202.

After the operator confirms the entire layout by referring to the layout screen 202 shown in FIG. 2B, he or she resumes the editing operation by switching screens such that the window displaying the edit screen 201 overlaps the other screen as shown in FIG. 2A. When the operator requests another edit area, he or she specifies the area on the layout screen 202 with the overlapping as shown in FIG. 2B, and then resumes the editing operation after switching the screens such that the edit screen 201 becomes active as shown in FIG. 2A.

In addition to the above described prior art technologies, a screen display mode such as an enlarge mode, a reduce mode, etc. can be preliminarily specified for each screen as an optional zooming edit method so that a screen display mode can be switched if necessary for efficient editing. For example, an editing operation is roughly performed on a screen display reduce mode. Then, the mode is switched to an enlarge mode for detailed editing. Repeating the above described operations allows the operator to complete his or her editing operation.

However, the prior art technologies have the following problems.

Method 1 requires a step of switching the display screen 101 to the layout screen 102 and a step of switching back to the edit screen 101 to resume the editing operation. Therefore, the operator cannot edit data while watching the layout screen. Furthermore, predetermined steps are required when specifying another edit area.

Method 2 requires a step of switching the window displaying the layout screen 202 to or from the window displaying the edit screen 201. If the windows are designed not to overlap each other so as to omit this step, displayed simultaneously on a single screen are the window displaying the layout screen 302 and the window displaying the edit screen 301 as shown in FIG. 3. In this case, the size of the window displaying the edit screen 301 is smaller than the other window. Therefore, the amount of the information displayed on the edit screen 301 is smaller. If the edit area is switched, a predetermined procedure must be followed.

Furthermore, in the above described optional zooming edit method, the operator should switch the screen display mode if the reduced scale of the edit screen is altered.

SUMMARY OF THE INVENTION

The present invention has been developed to solve the above described problems of prior art technologies, and requires no switching operations for displaying an entire screen of a layout screen, etc. It aims to provide an edit screen enlargement/reduction control system in which data can be edited with a layout being taken into much consideration.

When the operator selects optional graphics from among those displayed on the screen, the selected graphics are displayed on the screen. If the operator edits the graphics displayed on the edit screen, each graphic data on the edit screen is controlled for enlargement or reduction based on the operator's editing of the graphics.

The present invention resides in an edit screen display control device comprising selecting unit for selecting optional elements on a screen, display unit for displaying the elements selected by the selecting unit in an enlargement/reduction area on the screen, editing unit for editing an element in the selected elements and enlargement/reduction control unit for controlling enlargement/reduction of the selected elements based on an editing process performed on the element by the editing unit.

BRIEF DESCRIPTION OF THE DRAWINGS

One skilled in the art can easily understand additional features and objects of this invention from the description of the preferred embodiments and some of the attached drawings. In the drawings:

FIGS. 4A, 4B, 4C, and 4D show the principle of the present invention;

FIGS. 5A, 5B, 5C, and 5D show the moving of the graphics to be edited according to the present invention;

FIGS. 6A, 6B, 6C, and 6D show the modifying of the graphics to be edited according to the present invention;

DESCRIPTION OF THE PREFERRED EMBODIMENT

Figure 1B:
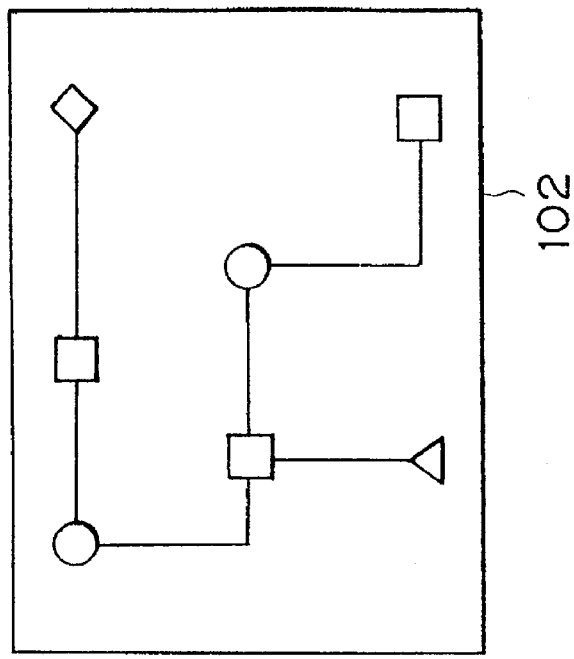
FIGS. 1A and 1B show an editing operation by switching between an edit screen and a layout screen according to the first prior art.
Figure 1A:
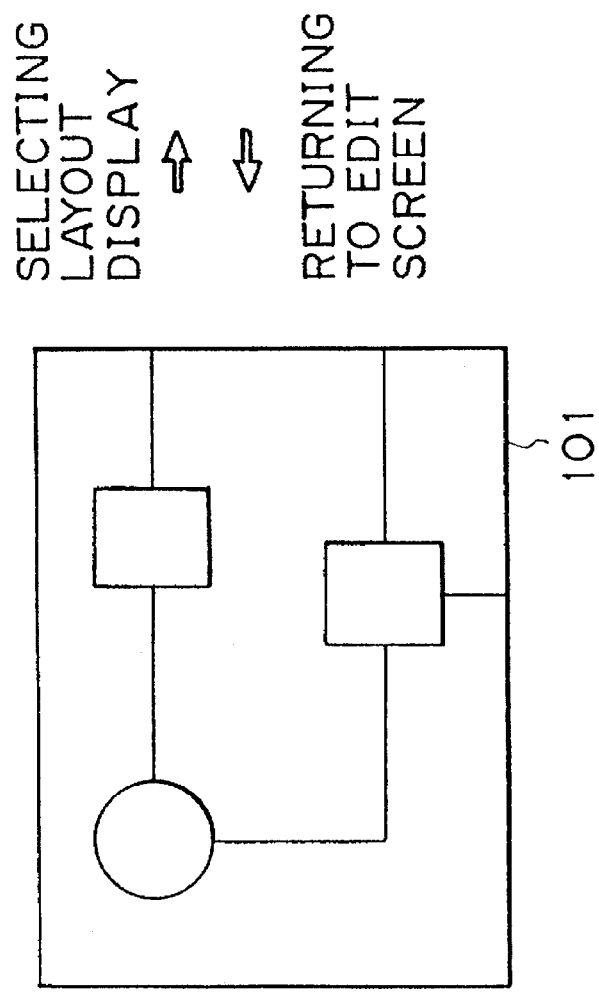
Figure 2B:
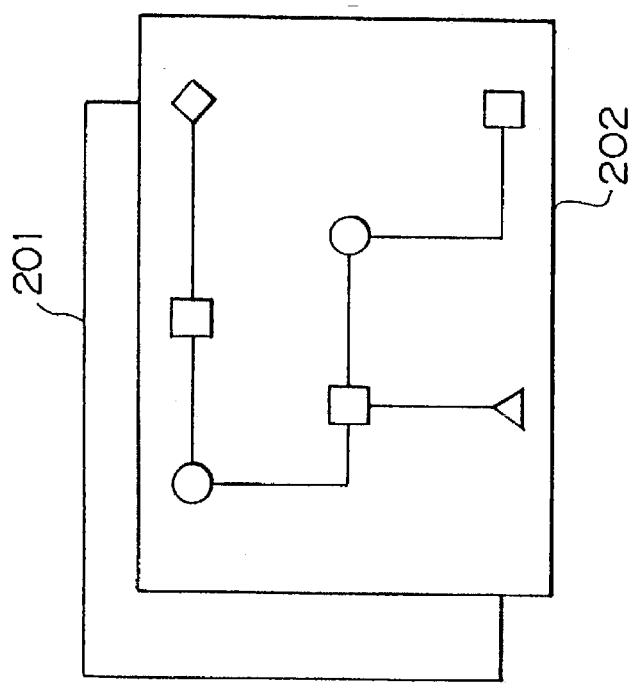
FIGS. 2A and 2B show an editing operation with a multiwindow configuration according to the second prior art.
Figure 2A:
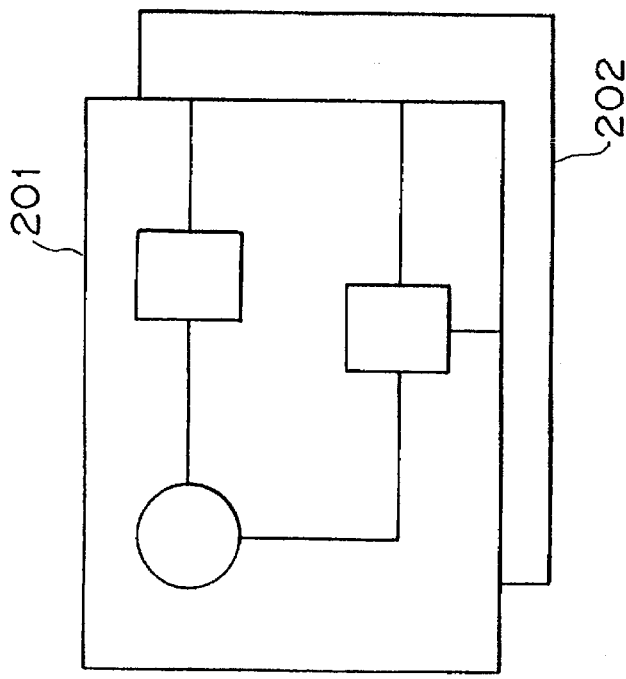
Figure 3:
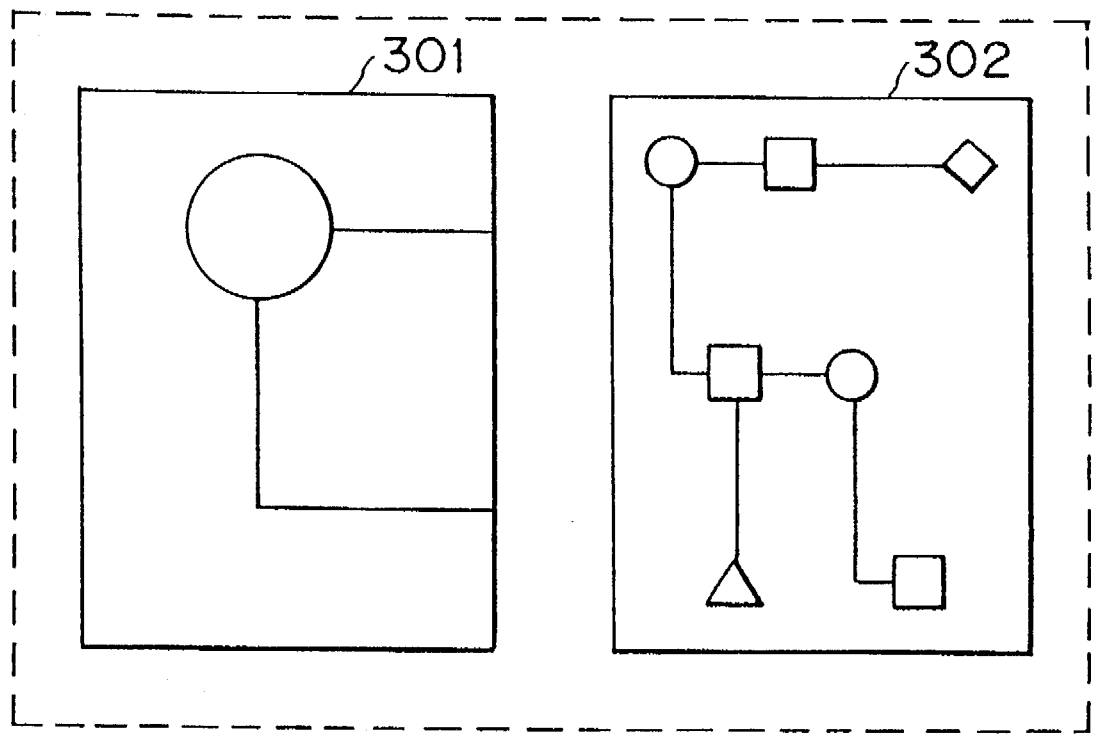
FIG. 3 shows the problems of the second prior art.

FIGS. 4A to 4D are the block diagrams showing the principle of the present invention. Described below are graphics, but it is obvious that the present invention is not limited to an editing process on graphics, but can be applied to an editing process on text containing character information.

In FIGS. 4A to 4D, a layout screen of all graphics is displayed on a display screen 406. An operator selects graphics to be edited by an enlarging/reducing process using an external input device 405 from among the graphics displayed on the layout screen. A selecting unit 401 selects graphics based on an instruction from the external input device 405. Graphics are selected by a method of selecting graphics in a rectangular area segmented according to a start point and an end point on the display screen 406 designated by the external input device 405, by a method of individually selecting graphics by a clicking operation of the external input device 405.

After graphics have been selected, an enlargement/reduction area 407 is displayed on the display screen 406, and the graphics selected by the selecting unit 401 are displayed on the enlargement/reduction area 407 by a display unit 402. At this time, an enlargement/reduction control unit 404 performs an enlargement/reduction control such that graphics to be enlarged/reduced can be encompassed by the enlargement/reduction area 407. If graphics are selected with the rectangular area specified, then the rectangular area can be the enlargement/reduction area 407.

As described above, FIG. 4B shows the graphics displayed in the enlargement/reduction area 407. Four graphics A, B, C, and D to be enlarged/reduced are selected from the graphics displayed on the layout screen. Assuming that an operator edits graphics D in the enlargement/reduction area 407, FIG. 4C shows that graphics D has been moved to the right and is just moving out of the enlargement/reduction area 407. If graphics D is further moved to the right, the enlargement/reduction control unit 404 reduces each of the graphics to be reduced as shown in FIG. 4D. Then, the display unit 402 displays each of the graphics to be reduced exactly within the enlargement/reduction area 407. An editing unit 403 edits the graphics at an instruction of the external input device 405.

If graphics D within the enlargement/reduction area 407 shown in FIG. 4D is moved to the left, a space area is generated to the right of the enlargement/reduction area 407. Then, the enlargement/reduction control unit 404 performs an enlargement control on each of the graphics to be enlarged. Thus, the display unit 402 displays each of the enlarged graphics exactly within the enlargement/reduction area 407 as shown in FIG. 4B.

FIGS. 5A through 5D and 6A through 6D show the general configuration of the present invention comprising an information processing device 501 for editing graphics displayed on the display screen, a display control device 502 for controlling display of graphics on the display screen, a display device 503 for displaying graphics, a mouse 504 used as an external input device, and a file 505 for storing graphic data, etc. FIGS. 5B through 5D and 6B through 6D show graphics to be enlarged/reduced displayed within the enlargement/reduction area 407 on the display device 503.

Figure 7:
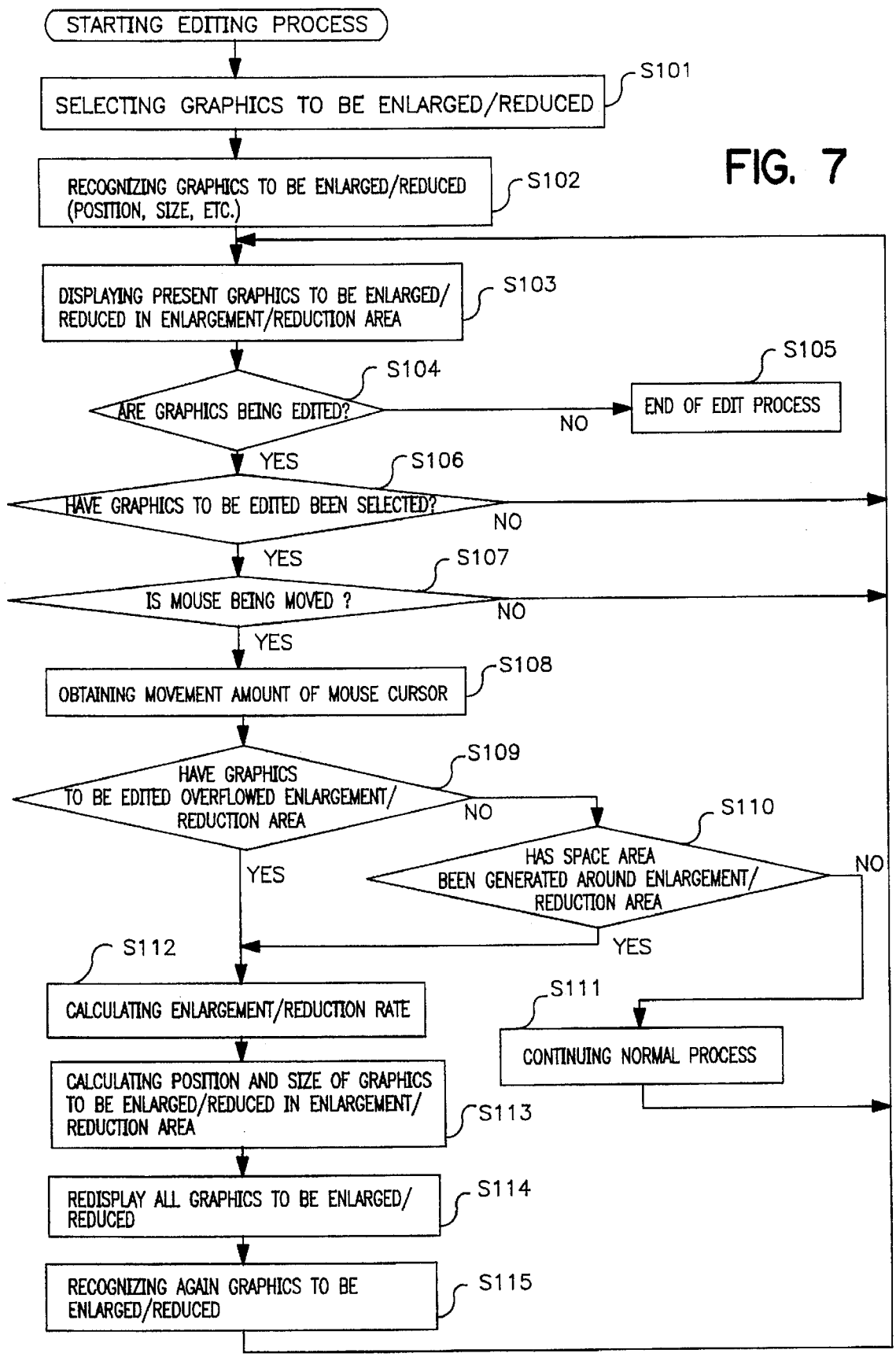
FIG. 7 is the flowchart showing the outline of the present invention.
Figure 8A:
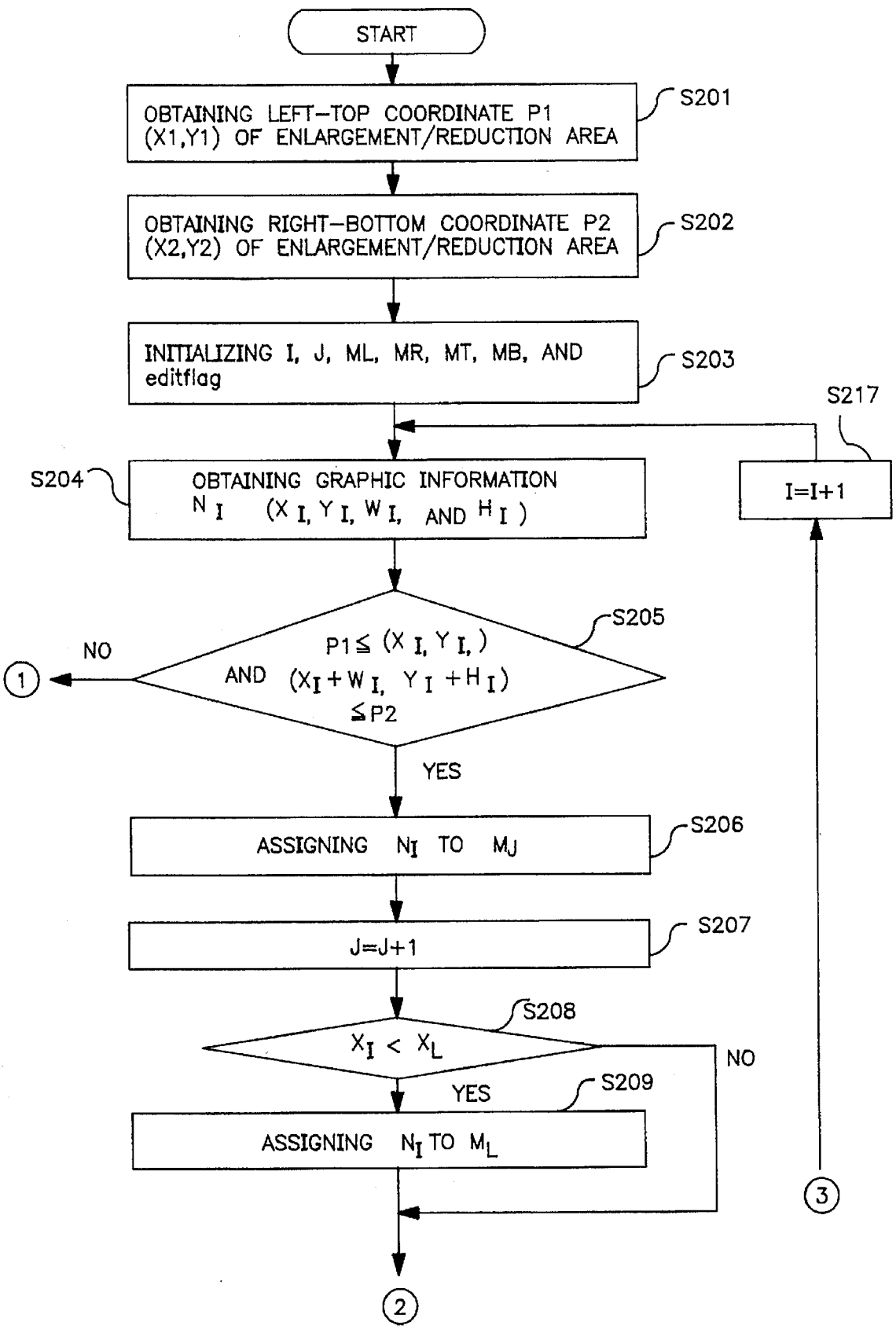
FIGS. 8A, 8B, 8C, and 8D are the flowchart showing the details of the present invention.
Figure 8B:
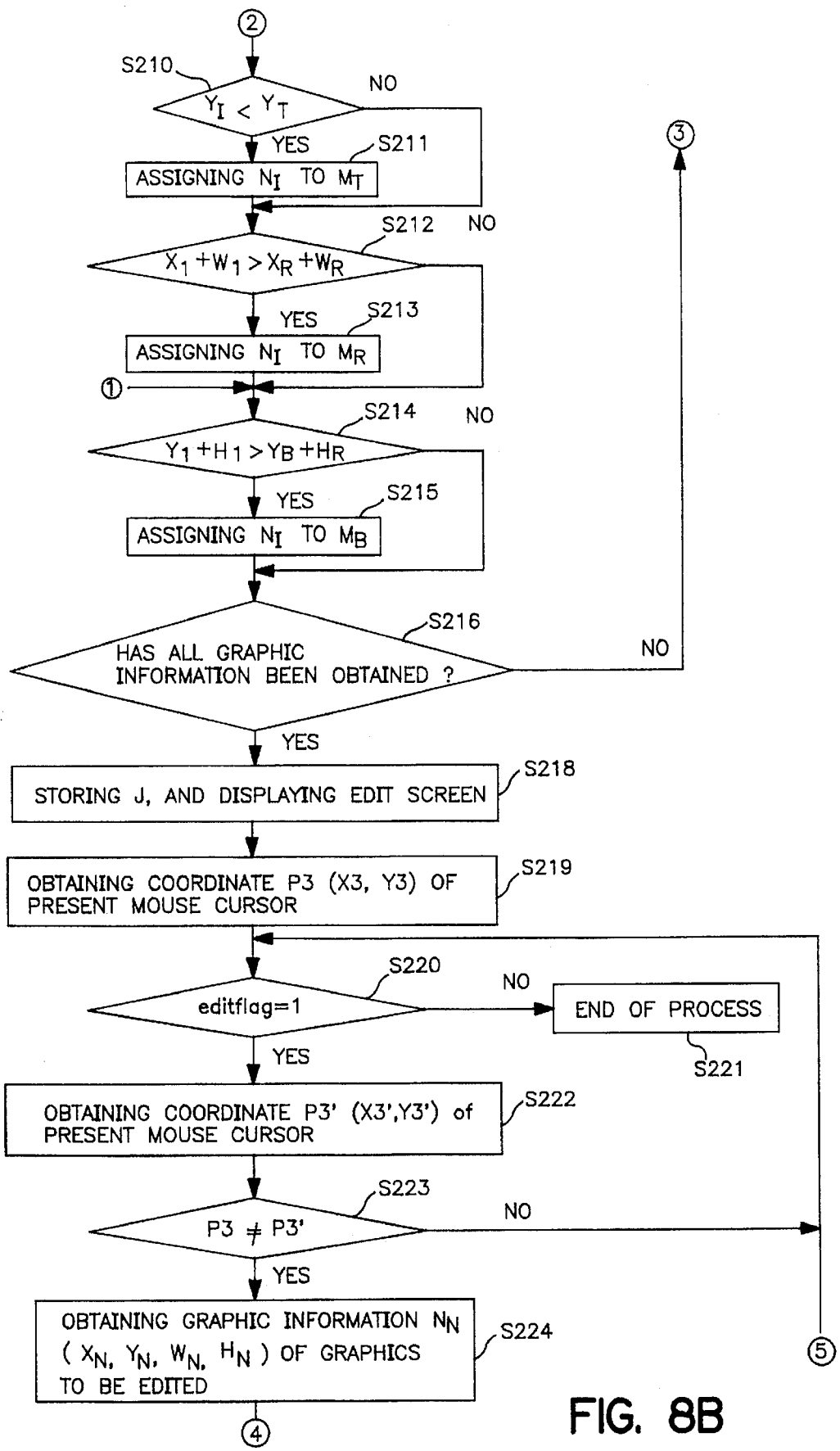
Figure 8C:
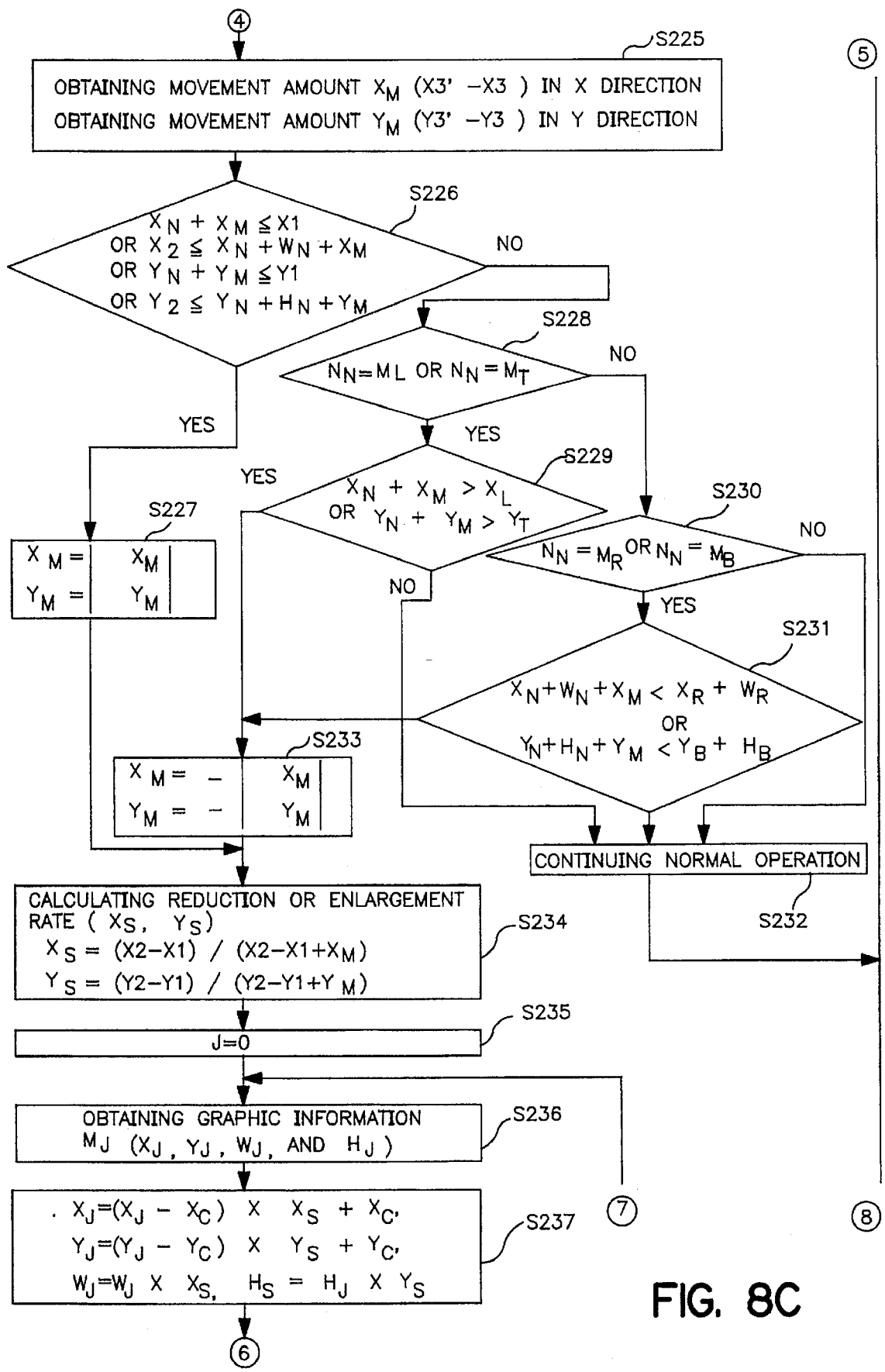
Figure 8D:
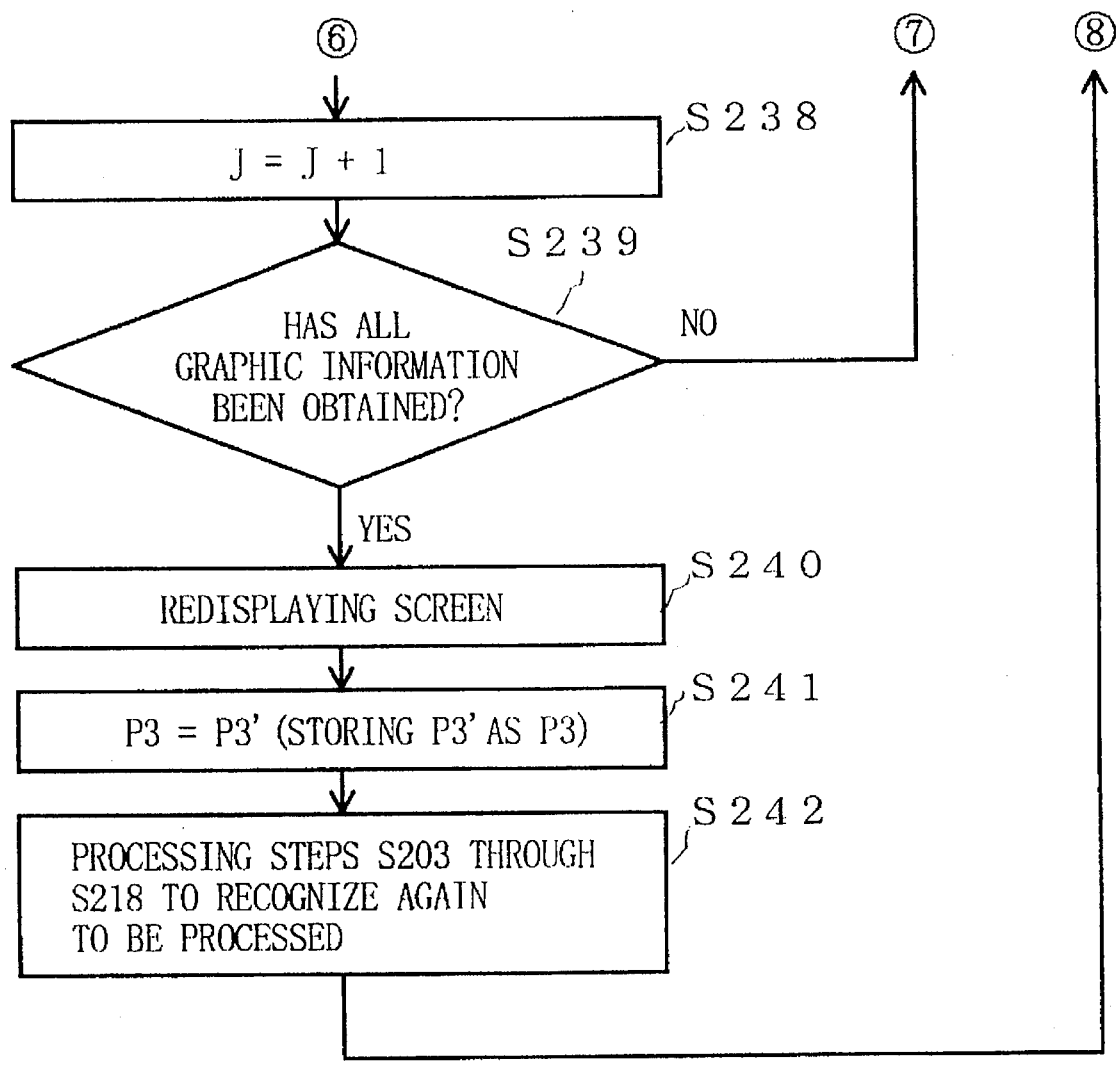

FIG. 7 is the flowchart showing the outline of the present invention. Explained below is the outline of the present invention by referring to FIGS. 5A through 5D, 6A through 6D, and 7.

First, graphics to be enlarged/reduced are selected from the graphics displayed on the layout screen. The graphics are selected as the graphics to be enlarged/reduced in the rectangular area specified using the mouse 504 with the start point and the end point on the layout screen. For example, a mouse button of the mouse 504 is pushed at position a on the layout screen. Then, the mouse 504 is moved to position b with the button pushed, and the button is released at position b as shown in FIGS. 5B and 6B. Now, selected are the graphics to be enlarged/reduced and displayed within the rectangular area having a diagonal line a and b where a is a start point and b is an end point of the rectangle. Each of the graphics to be enlarged/reduced can also be directly selected by clicking the mouse 504 (step S 101).

It is necessary to recognize the graphics to be enlarged/reduced after they have been selected in step S 101. The graphics information displayed on the layout screen is all stored in the file 505, and sequentially read from the file 505 when graphics to be enlarged/reduced are determined. Thus, the display position, size, etc. of each of the graphics to be enlarged/reduced are recognized (step S 102).

Then, all the graphics to be enlarged/reduced and selected in step S 101 are displayed within an enlargement/reduction area. If the graphics to be enlarged/reduced have been selected with a rectangular area specified, then the rectangular area can be an enlargement/reduction area as is, or can be enlarged/reduced for use as an enlargement/reduction area. On the other hand, if graphics to be enlarged/reduced are selected individually by clicking the mouse 504, then the enlargement/reduction area are set such that all selected graphics can be encompassed by the area. (step S 103).

Then, it is determined whether or not the editing operation has been completed. The completion of an editing operation is determined if a clicking of a mouse button is detected after a mouse cursor, which interlocks with the mouse 504, has moved to the position indicating the end-of-operation on the display screen. On completion of the editing operation, control is passed to the process in step S 105, terminating the editing operation. If the editing operation is to be continued, control is passed to step S 106 (step S 104).

If it is determined in step S 104 that the editing operation has been completed, then the enlargement/reduction area is cleared to display the layout screen, and the editing operation terminates (step S 105).

Then, it is determined whether or not graphics to be edited have been selected from the graphics displayed in the enlargement/reduction area. One or more graphics to be edited can be selected by clicking the button of the mouse 504 from the graphics displayed in the enlargement/reduction area. Control is passed to step S 107 if graphics to be edited have been selected, and is returned to step S 103 if no graphics have been selected yet.

Then, it is determined whether or not the mouse 504 has been moved. If no, control is returned to step S 103. If yes, control is passed to the next step S 108 (step S 107).

When the mouse 504 is moved, a movement amount of the mouse 504 is fetched, and the graphics to be edited move in response to the movement of the mouse 504 if graphics are edited by moving them. FIG. 5C shows the case where graphics D to be processed are moved to the right. If graphics are edited by modifying them, then the graphics to be edited is modified in response to the movement of the mouse 504. FIG. 6C shows the case where graphics D to be edited have been modified (enlarged)(step S 108).

Next, it is determined whether or not the graphics to be edited are completely encompassed by the enlargement/reduction area. If they are completely encompassed, control is passed to step S 110. If they are not completely encompassed by the enlargement/reduction area, then control is passed to step S 112 (step S 109).

If the graphics to be edited are completely encompassed by the enlargement/reduction area, then it is determined whether or not a space area has been generated around the enlargement/reduction area as a result of an editing of the graphics to be edited. If no space area has been generated, control is passed to step S 111. If any space area has been generated, control is passed to step S 112 (step S 110).

If no space area is generated in step S 110, the graphics in the enlargement/reduction area need not be enlarged/reduced. In this case, the position of the graphics is obtained after they are repositioned if graphics are edited by repositioning them. If graphics are edited by modifying them, the size of the graphics is obtained and the graphics to be edited are displayed again. Then, control is returned to step S 103 (step S 111).

If the graphics to be enlarged/reduced are not completely encompassed by the enlargement/reduction area, then a reduction rate is calculated such that the entire graphics can be encompassed by the enlargement/reduction area. If a space area is generated around the enlargement/reduction area, then an enlargement rate is calculated such that the entire graphics to be enlarged can be completely encompassed by the enlargement/reduction area (step S 112).

Then, based on the enlargement/reduction rate obtained in step S 112, the size and position of each of the graphics are calculated (step S 113).

Next, in accordance with the size and position of each of the graphics to be enlarged/reduced, the entire graphics to be enlarged/reduced are displayed again. FIG. 5D shows the case where each of the graphics to be enlarged/reduced in the enlargement/reduction area is reduced as a result of a moving to the right of graphics D to be edited. FIG. 6D shows the case where graphics to be reduced in the enlargement/reduction area are reduced as a result of a modifying (enlarging) of graphics D to be edited (step S 114).

Furthermore, if new graphics are displayed in the enlargement/reduction area as a result of a moving or a modifying of graphics to be edited, the graphics are added to the graphics to be enlarged/reduced, and control is returned to step S 103 (step S 115).

If graphics D is moved to the left unlike the above described case, or modified (reduced), then the enlargement/reduction area shown in FIGS. 5A to 5D and FIGS. 6A to 6D changes from that shown in FIGS. 5D and 6D to 5C and 6C and further to 5B and 6B, and each of the graphics to be enlarged/reduced in the enlargement/reduction area (except graphics D shown in FIGS. 6A to 6D) are enlarged.

The above described processes are explained furthermore in detail by referring to FIGS. 8A through 8D.

Variables are set as follows in the flowchart.

P1 (X1, Y1): a left-top coordinate of an enlargement/reduction area

P2 (X2, Y2): a right-bottom coordinate of an enlargement/reduction area

P3 (X3, Y3): a coordinate of the mouse cursor depending on the movement of the mouse P3' (X3', Y3'): the latest coordinate of the mouse cursor XM, YM: a movement amount of the mouse cursor editflag: edit-status flag (1=editing, 0=not editing)

NI (XI, YI, WI, HI): graphic information (x coordinate at left-top point, y coordinate at left-top point, width, and height)(I=0~n: number of graphics)

MJ (XJ, YJ, WJ, HJ): stored information about graphics to be enlarged/reduced

ML (XL, YL, WL, HL): leftmost coordinate information of an enlargement/reduction area MR (XR, YR, WR, HR): rightmost coordinate information of an enlargement/reduction area MT (XT, YT, WT, HT): upper limit coordinate information of an enlargement/reduction area MB (XB, YB, WB, HB): lower limit coordinate information of an enlargement/reduction area NN (XN, YN, WN, HN): information about graphics to be edited PC (XC, YC): a reference point of enlargement/reduction in an enlargement/reduction area XS, YS: reduction/enlargement rate The above listed leftmost coordinate information, rightmost coordinate information, upper limit coordinate information, and lower limit coordinate information of an enlargement/reduction area respectively indicates the information about leftmost graphics, rightmost graphics, upper limit graphics, and lower limit graphics in the enlargement/reduction area.

First, the left-top coordinate P1 of the enlargement/reduction area is obtained by pressing the button of the mouse 504. Moving the mouse 504 with its button pressed displays a rectangular area which is determined with the left-top coordinate P1 of the enlargement/reduction area and the mouse cursor (step S 201).

Figure 9:
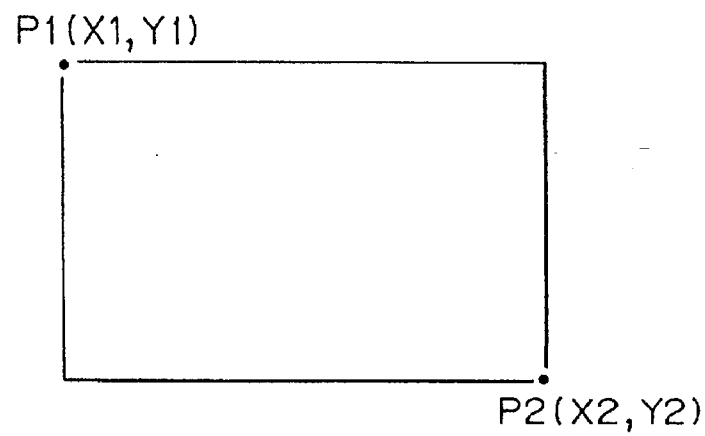
FIG. 9 shows a setting of an enlargement/reduction area.

Then, the right-bottom coordinate P2 of the enlargement/reduction area is obtained by releasing the button of the mouse 504. The left-top coordinate P1 and the right-bottom coordinate P2 of the enlargement/reduction area determine a rectangular area as an enlargement/reduction area. Thus, the enlargement/reduction area is the area encompassed by the rectangular area shown in FIG. 9 (step S 202).

Parameters I, J, ML, MR, MT, MB, and editflag are initialized (step S 203).

Figure 10:
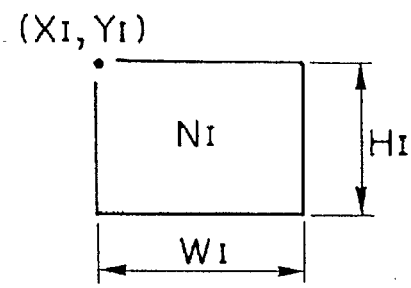
FIG. 10 shows the coordinates of graphics to be enlarged/reduced.

Then, graphic information about graphics I is obtained in the layout screen. The graphic information contains four parameters XI, YI, WI, and HI as shown in FIG. 10. XI indicates the left-top X coordinate of graphics I; YI indicates the left-top Y coordinate of graphics I; WI indicates the width of the graphics; and HI indicates the height of the graphics (step S 204).

It is determined whether or not the graphics I obtained in the preceding step S 204 are completely encompassed by the rectangular area determined in step S 202. The obtained graphic information NI is compared with the left-top coordinate P1 and the right-bottom coordinate P2 of the enlargement/reduction area as follows.

$$XI<X1, Y1<YI, XI+WI<X2, YI+HI<Y2$$

Figure 11:
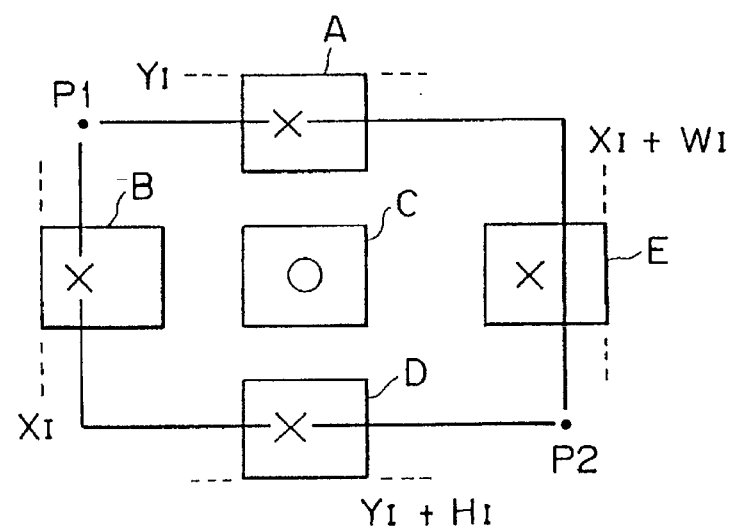
FIG. 11 shows whether or not graphics are included in an enlargement/reduction area.

If all conditions are satisfied, then graphics I are regarded as graphics to be enlarged/reduced, and control is passed to step S 206. If all conditions are not satisfied, then graphics I are not regarded as graphics to be enlarged/reduced, and control is passed to step S 216. As shown in FIG. 11, since graphics A, B, D, and E are not completely encompassed by the rectangular area, they are not regarded as graphics to be enlarged/reduced. On the other hand, since graphics C is completely encompassed by the rectangular area, it is regarded as graphics to be enlarged/reduced (step S 205).

In the previous step S 205, when graphics I are regarded as graphics to be enlarged/reduced, graphic information NI of graphics I is assigned to MJ and stored (step S 206).

Then, the value of J is incremented (step S 207).

It is determined whether or not the leftmost X coordinate XI of graphics I is smaller than the X coordinate XL of the leftmost coordinate ML of the enlargement/reduction area. If XI is smaller than XL, then control is passed to the next step S 209. Otherwise, control is passed to step S 210 (step S 208).

Figure 12:
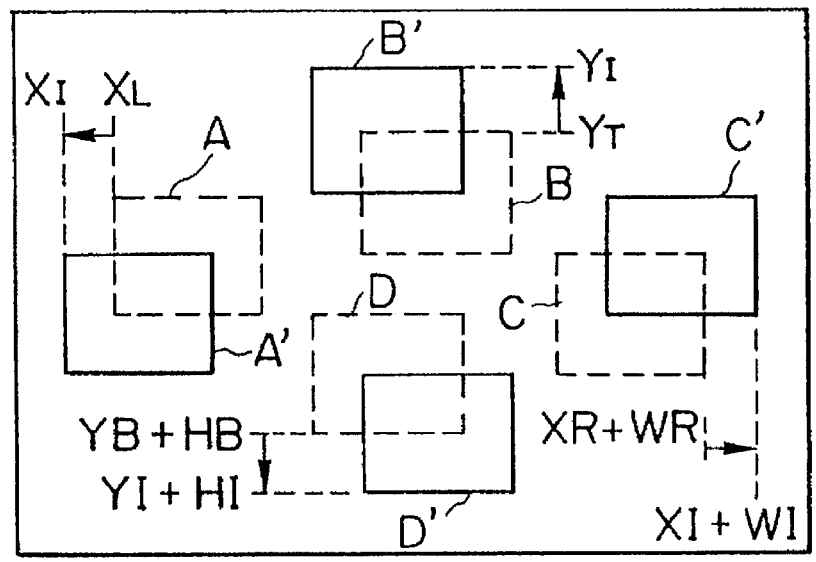
FIG. 12 shows graphics to be processed according to coordinate information ML, MR, MT, and MB.

If XI is smaller than XL, then the graphic information NI of graphics I is assigned to the leftmost coordinate ML of the enlargement/reduction area. Since graphics A' are positioned left of A as shown in FIG. 12, the leftmost coordinate ML of the enlargement/reduction area is updated from the coordinate of graphics A to that of graphics A' (step S 209).

Then, it is determined whether or not the Y coordinate YI at the upper limit of graphics I is smaller than the Y coordinate YT of the uppermost coordinate MT of the enlargement/reduction area. If YI is smaller than YT, then control is passed to the next step S 211. Otherwise, control is passed to step S 212 (step S 210).

If YI is smaller than YT, then the graphic information NI of graphics I is assigned to the upper limit coordinate MT of the enlargement/reduction area. Since graphics B' shown in FIG. 12 is positioned above graphics B, the upper limit coordinate MT of the enlargement/reduction area is updated from the coordinate of graphics B to that of graphics B' (step S 211).

Next, it is determined whether or not the rightmost X coordinate XI+WI of graphics I is larger than the X coordinate XR+WR of the rightmost coordinate MR of the enlargement/reduction area. If XI+WI is larger than XR+WR, then control is passed to the next step S 213. Otherwise, control is passed to step S 214 (step S 212).

If XI+WI is larger than XR+WR, then the graphic information NI of graphics I is assigned to the rightmost coordinate MR of the enlargement/reduction area. Since graphics C' shown in FIG. 12 is positioned to the right of C, the rightmost coordinate MR of the enlargement/reduction area is updated from the coordinate of graphics C to that of graphics C' (step S 213).

Next, it is determined whether or not the Y coordinate YI+HI at the lower limit of graphics I is larger than the Y coordinate YB+HB of the lower limit coordinate MB of the enlargement/reduction area. If YI+HI is larger than YB+HB, then control is passed to the next step S 215. Otherwise, control is passed to step S 216 (step S 214).

If YI+HI is larger than YB+HB, then the graphic information NI of graphics I is assigned to the lower limit coordinate MB of the enlargement/reduction area. Since graphics D' are positioned below graphics D as shown in FIG. 12, the lower limit coordinate MB of the enlargement/reduction area is updated from the coordinate of graphics D to that of graphics D' (step S 215).

Then, it is determined whether or not graphic information about all graphics in the layout screen has been obtained. If no, control is passed to step S 217. If yes, control is passed to step S 218 (step S 216).

I is incremented to obtain the graphic information of the next graphics, and control is returned to step S 204 (step S 217).

Since it has been determined for all graphics in the layout screen whether or not graphics are to be enlarged/reduced, J is stored as the number of graphics to be enlarged/reduced. The enlargement/reduction area is also displayed. In the following descriptions, the rectangular area set in steps S 201 through S 202 is used as an enlargement/reduction area (step S 218).

Next, the coordinate P3 (X3, Y3) of the present mouse cursor is obtained (step S 219).

It is determined whether or not editflag, which is set when the rectangular area is set, indicates "1". If editflag indicates 1, then it is considered that graphics in the enlargement/reduction area are edited, and control is passed to step S 222. If editflag indicates 0, then it is considered that graphics in the enlargement/reduction area are not edited, and control is passed to step S 221 and the process terminates (step S 220).

If it is determined that the graphics are edited terminates in the previous step, the coordinate P3' (X3', Y3') of the present mouse cursor is obtained (step S 222).

It is determined whether or not the coordinate P3 of the previous mouse cursor equals the coordinate P3' of the present mouse cursor. If yes, it is considered that the mouse 504 has not moved, and control is returned to step S 220. If no, it is considered that the mouse 504 has moved, and control is passed to the next step S 224 (step S 223).

If the mouse 504 has moved, graphics N to be edited are selected, and the graphic information NN (XN, YN, WN, and HN) is obtained. However, described below is the case where only one of the graphics in the enlargement/reduction area is selected to be edited (step S 224).

Figure 13:
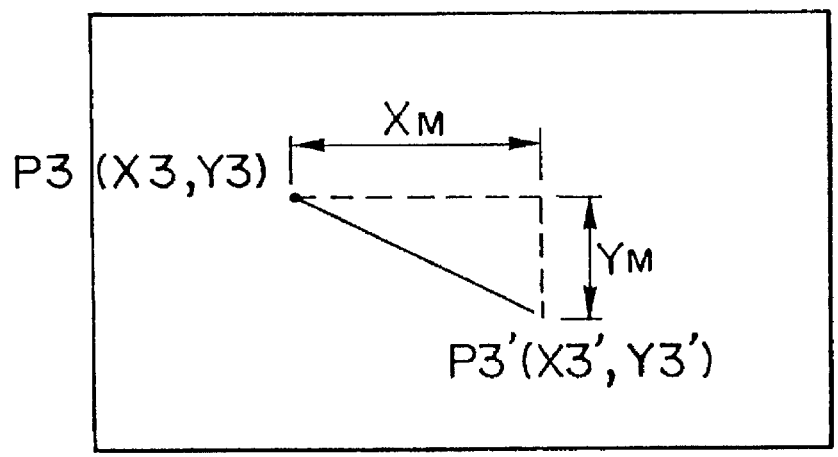
FIG. 13 shows an obtaining of the movement amount of a mouse cursor.

Next, calculated are the amount XM=X3'−X3 of the movement of the mouse cursor in the X direction, and the amount YM=Y3'−Y3 of the movement of the mouse cursor in the Y direction. Graphics N to be edited are selected in the previous step S 224 and move depending on the movement of the mouse cursor. FIG. 13 shows the movement of the mouse cursor and the amount of its movement (step S 225).

In response to the movement of the graphics to be edited, it is determined whether or not the graphics to be edited are completely encompassed by the enlargement/reduction area based on the following four conditions.

$$XN+XM<X1, X2<XN+WN+XM, YN+YM<Y1, Y2<YN+HN+YM$$

Figure 14:
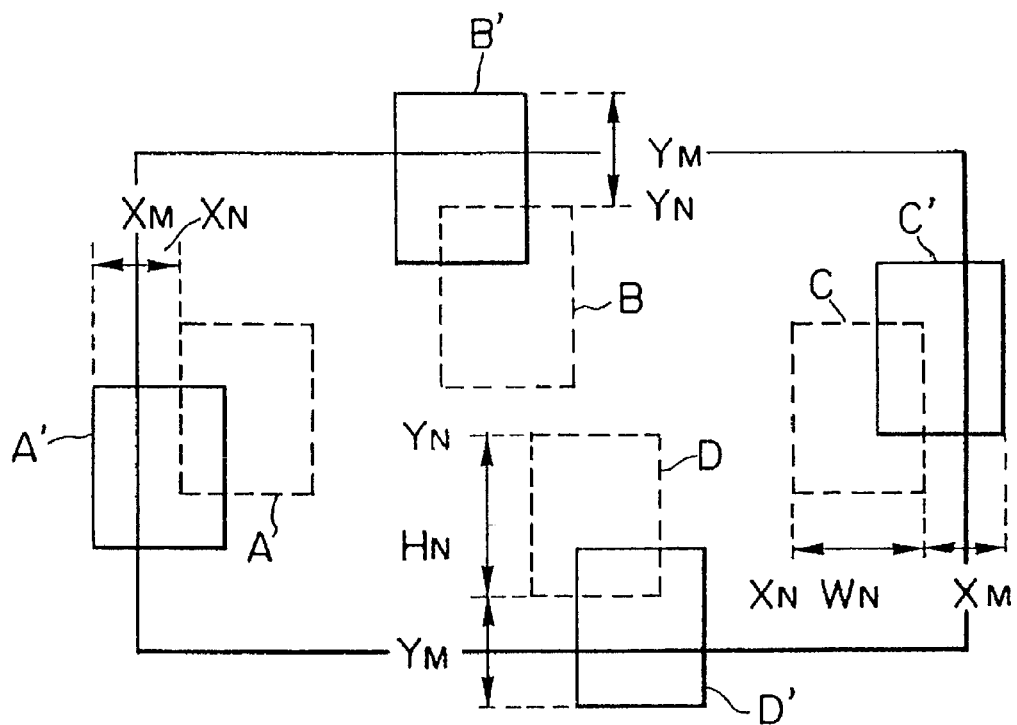
FIG. 14 shows the case in which graphics are not completely encompassed by an enlargement/reduction area as a result of the movement.

If one of the above listed conditions is satisfied, then it is determined that the graphics are not completely encompassed by the enlargement/reduction area, and control is passed to step S 227 so that an enlargement/reduction control can be performed. If none of the four conditions are satisfied, it is determined that all graphics are completely encompassed by the enlargement/reduction area, and control is passed to step S 228. FIG. 14 shows the case where graphics A through D are not completely encompassed by the enlargement/reduction area. Graphics A' through D' are obtained by respectively moving graphics A through D left, upward, right, and downward, and are not completely encompassed by the enlarged/reduction area (step S 226).

If graphics to be edited are not completely encompassed by the enlargement/reduction area in step S 226, then an absolute value of XM is assigned to the amount XM of the movement of the mouse cursor in the X direction, and an absolute value of YM is assigned to the amount YM of the movement of the mouse cursor in the Y direction (step S 227).

If graphics to be edited are completely encompassed by the enlargement/reduction area in step S 226, it is determined in steps S 228 through S 231 whether or not a space area has been generated around the enlargement/reduction area. First, it is determined whether or not the graphic information NN of graphics to be edited matches the leftmost information ML of the enlargement/reduction area OR the upper limit information MT of the enlargement/reduction area. If yes, control is passed to step S 229. If no, control is passed to step S 230 (step S 228).

Figure 15:
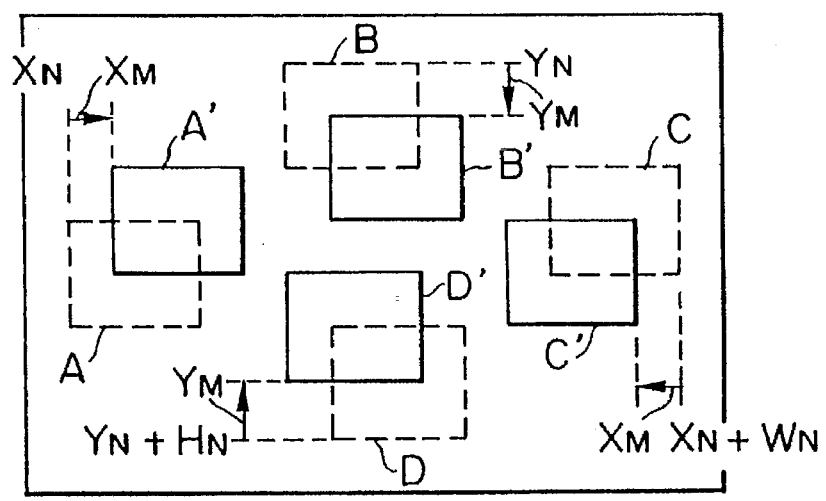
FIG. 15 shows the case in which a space area is generated around an enlargement/reduction area as a result of the movement.

If the graphic information NN of graphics to be edited matches the leftmost information ML of the enlargement/reduction area, then a space area is generated around the enlargement/reduction area if the mouse cursor is moved in the positive ("+") X direction. If the graphic information NN of graphics to be edited matches the upper limit information MT of the enlargement/reduction area, then a space area is generated around the enlargement/reduction area if the mouse cursor is moved in the positive ("+") Y direction. If there is a space area generated around the enlargement/reduction area, control is passed to step S 233 to control enlargement/reduction. If there is no space area generated around the enlargement/reduction area, then control is passed to step S 232 to continue the process. FIG. 15 shows that a space area has been generated around the enlargement/reduction area by the movements of graphics A through D. In FIG. 15, a space area is generated around the enlargement/reduction area by moving graphics A and B to the right and downward to the positions of graphics A' and B' respectively (step S 229).

Then, it is determined whether or not the graphic information NN of graphics to be edited matches the rightmost information MR of the enlargement/reduction area or the lower limit information MB of the enlargement/reduction area. If yes, control is passed to step S 231. If no, control is passed to step S 232 (step S 230).

If the graphic information NN of graphics to be edited matches the rightmost information MR of the enlargement/reduction area, then a space area is generated around the enlargement/reduction area by moving the mouse cursor in the negative ("−") X direction. If the graphic information NN of graphics to be edited matches the lower limit information MB of the enlargement/reduction area, then a space area is generated around the enlargement/reduction area by moving the mouse cursor in the negative ("−") Y direction. If there is a space area generated around the enlargement/reduction area, control is passed to step S 233 to control enlargement/reduction. If there is no space area generated around the enlargement/reduction area, then control is passed to step S 232 to continue the process. FIG. 15 shows that a space area has been generated around the enlargement/reduction area by the movements of graphics A through D. Graphics C' and D' are obtained by moving graphics C and D to the left and upward respectively (step S 231).

If no space area is generated around the enlargement/reduction area, then enlargement/reduction control is not required, and control is returned to step S 220 (step S 232).

If a space area is generated around the enlargement/reduction area, then an absolute value of XM provided with a minus sign is assigned to the amount XM of the movement of the mouse cursor in the X direction, and an absolute value of YM provided with a minus sign is assigned to the amount YM of the movement of the mouse cursor in the Y direction (step S 233).

Next, the reduction rate and the enlargement rate in the X and Y directions are calculated by the following equations, and then control is passed to step S 235 (step S 234).

$$XS=(X2-X1)/(X2-X1+XM)$$

$$YS=(Y2-Y1)/(Y2-Y1+YM)$$

Figure 16:
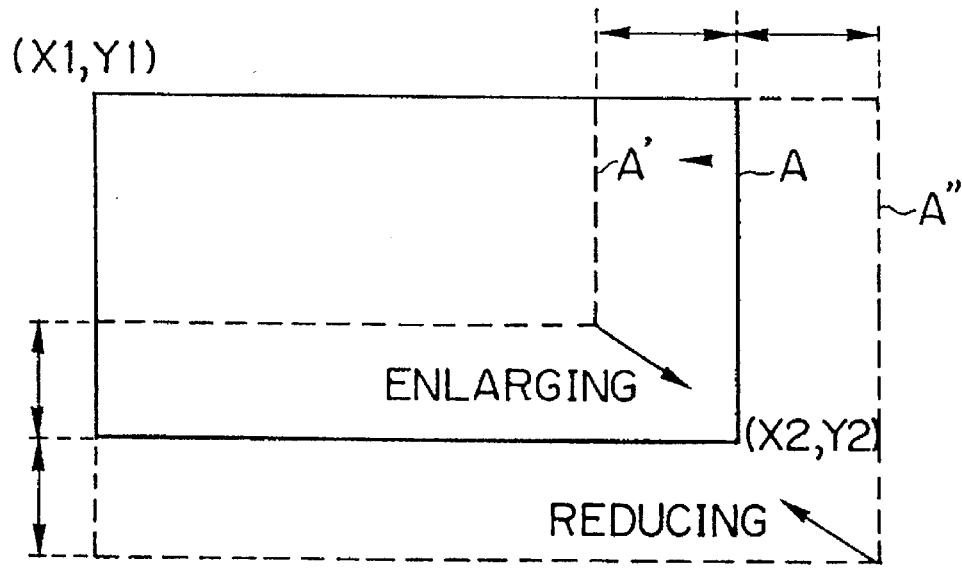
FIG. 16 shows an enlargement/reduction rate of graphics to be enlarged/reduced.

FIG. 16 shows the method of calculating the enlargement/reduction rate of graphics to be enlarged/reduced in the enlargement/reduction area by moving the mouse cursor. If moving the mouse cursor generates a space area around the enlargement/reduction area A, then the amount XM or YM of the movement of the mouse cursor is negative and the graphics to be enlarged/reduced can be displayed in area A'. However, since they are displayed in area A, the graphics to be enlarged/reduced are individually enlarged. The enlargement rate is calculated by the equation above.

If the edited graphics overflow the enlargement/reduction area A as a result of the movement of the mouse cursor, then the amount XM or YM of the movement of the mouse cursor is positive and requires area A" to display the graphics to be enlarged/reduced. However, the graphics to be edited are reduced so that they can be displayed in area A. The reduction rate is calculated by the equation above.

Then, "0" is assigned to the value of J indicating a number of graphics to be enlarged/reduced (step S 235)

Next, the graphic information MJ corresponding to the graphics number J of the graphics to be enlarged/reduced is obtained (step S 236).

Then, the information about the graphics J to be enlarged/reduced is calculated by the following equation based on the reduction rate and the enlargement rate obtained in step S 234. In the equation, XC and YC indicate the reference points based on which enlargement/reduction is controlled in the enlargement/reduction area. Normally, the reference points are at the left-top coordinate of the enlargement/reduction area (step S 237).

Figure 17:
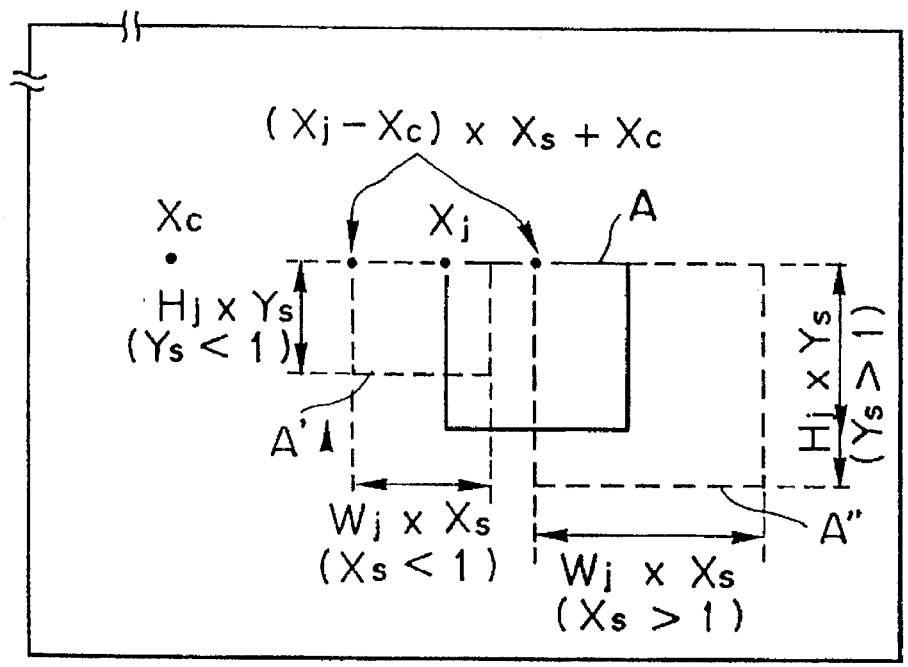
FIG. 17 shows where graphics are displayed as a result of an enlargement/reduction control of the graphics.

$XJ=(XJ-XC)\times XS+XC$, $YJ=(YJ-YC)\times YS+YC$, $WJ=WJ\times XS$, $HJ=HJ\times YS$ FIG. 17 shows the enlarged/reduced graphics of the original graphics A. That is, A is reduced into A' and enlarged into A".

Then, the graphics number J of the graphics to be enlarged/reduced is incremented (step S 238).

It is determined whether or not the graphics number J of the graphics to be enlarged/reduced matches the number of graphics to be enlarged/reduced stored in step S 218. If yes, it is determined that the graphics information about all graphics to be enlarged/reduced has been obtained. If no, control is returned to step S 236, and the graphic information about the next graphics to be enlarged/reduced is obtained (step S 239).

Then, according to the graphic information about all graphics to be enlarged/reduced in the enlargement/reduction area obtained in step S 237, all the graphics to be enlarged/reduced are redisplayed in the enlargement/reduction area (step S 240).

Next, the coordinate P3 of the mouse cursor is updated by assigning the coordinate P3' of the mouse cursor after the movement to the coordinate P3 of the mouse cursor at its original position (step S 241).

Finally, the processes similar to those in steps S 203 through S 218 are performed. If graphics not those to be enlarged/reduced before the movement of the graphics to be enlarged/reduced newly appear in the enlargement/reduction area as a result of the movement, the graphics are recognized as those to be enlarged/reduced and displayed in the enlargement/reduction area. If moving graphics to be edited changes the leftmost coordinate information ML, rightmost coordinate information MR, upper limit coordinate information, and lower limit coordinate information MB of the enlargement/reduction area, the related information is updated. Control is returned to step S 220 after the completion of the process (step S 242).

Thus, only one piece of graphics is selected as graphics to be edited from graphics to be enlarged/reduced, and each piece of the graphics to be enlarged/reduced in the enlargement/reduction area is displayed as enlarged/reduced as a result of the movement of graphics to be edited. The enlargement/reduction control can be performed in an editing operation such as a changing, deleting, adding, etc. of graphics to be enlarged/reduced by performing the processes similar to the above described processes.

Figure 18:
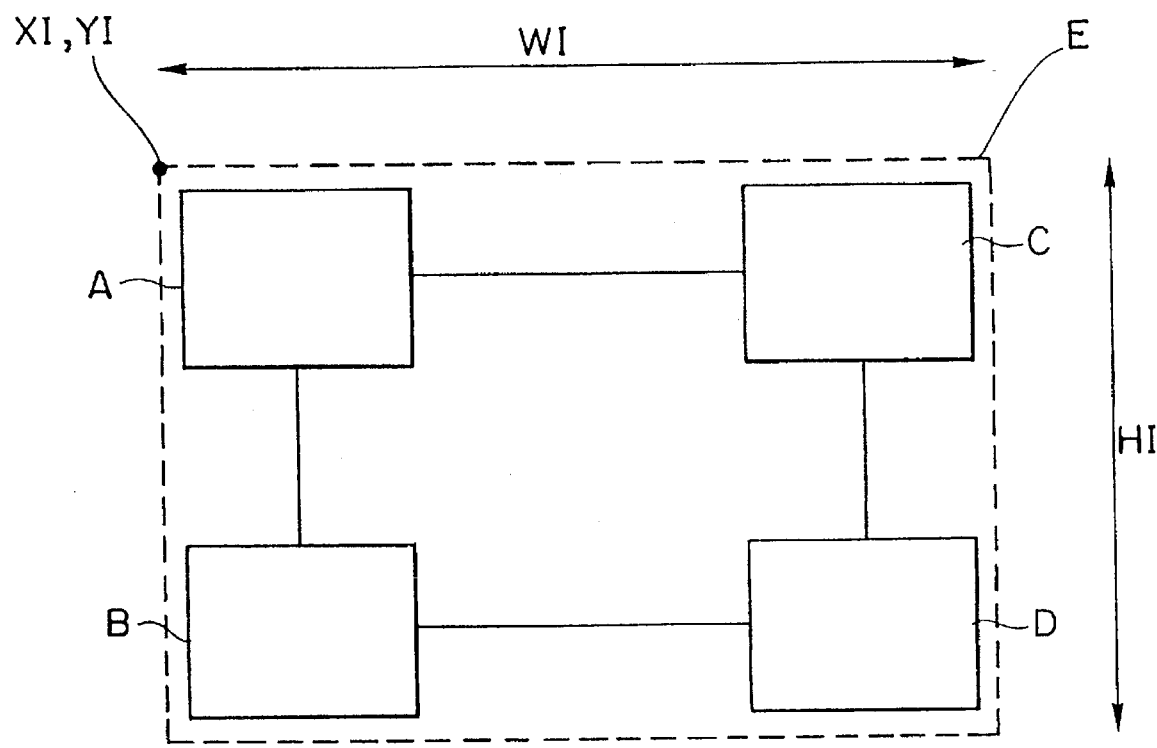
FIG. 18 shows the coordinates of a plurality of graphics selected to be edited from among graphics to be enlarged/reduced.

Explained above is the case where only one piece of graphics is selected as graphics to be edited. However, if a plurality of graphics A through D are selected as shown in FIG. 18, they can be processed as if they were selected as a single piece of graphics by obtaining graphics E which completely encompasses graphics A through D and by setting graphic information (XI, YI, WI, and HI) for graphics E as shown in FIG. 18.

Figure 19B:
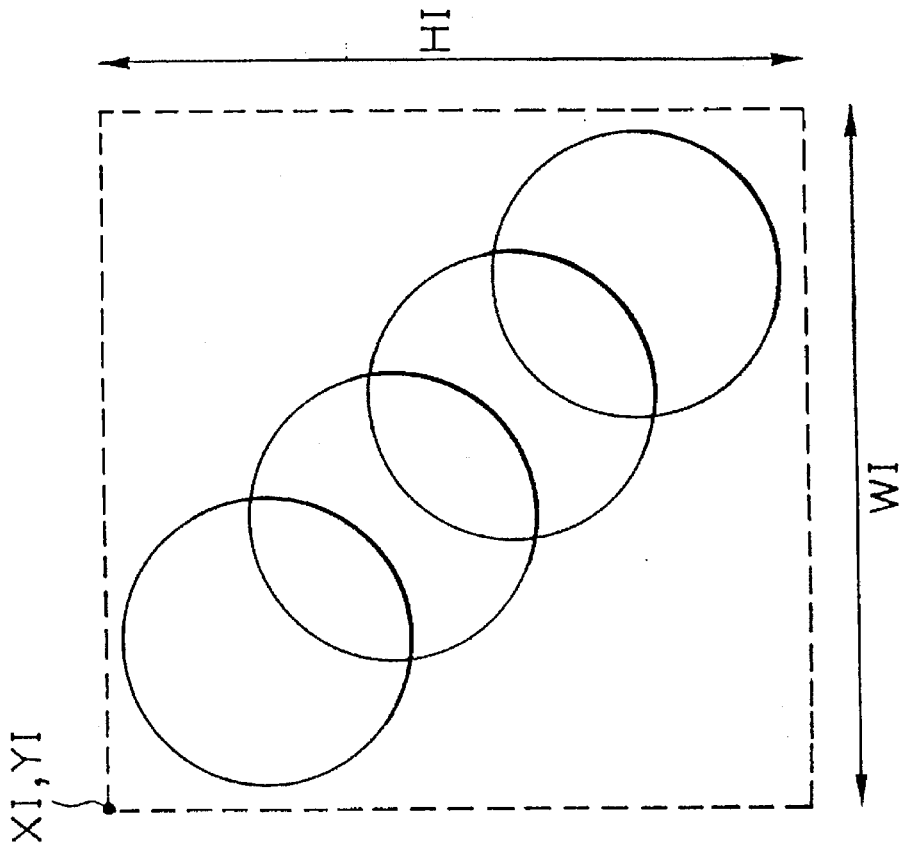
FIGS. 19A to 19B show the coordinates of graphics other than rectangles.
Figure 19A:
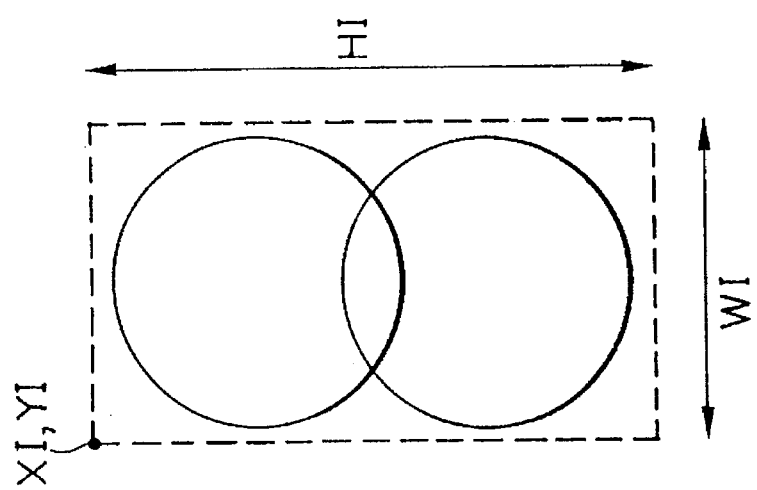

In the explanation above, the form of graphics is limited to a rectangle. However, as shown in FIGS. 19A and 19B, other form of graphics can be similarly processed as if they were rectangles by setting the minimum rectangular area containing the form other than a rectangle. Letters can also be processed as if they were rectangles by similarly setting a rectangular area.

The present invention can be applied to CAD for use in designing a circuit by processing graphics as logical circuits.

According to the present invention, necessary document portions can be constantly displayed in an enlargement/reduction area by editing not only graphics but also documents. Thus, text can be generated and proofread while referring to the context before and after the portion displayed in the enlargement/reduction area. Furthermore, documents containing graphics, tables, images, etc. as well as documents containing characters only can be edited.

The present embodiment is explained as being provided with a mouse as an external input device. However, it can also be provided with an input device such as a track ball, touch screen, tablet, pen, etc.

As described above, graphics are optionally selected as graphics to be enlarged/reduced in the layout screen according to the present invention. Each of the graphics to be enlarged/reduced in the enlargement/reduction area are automatically enlarged/reduced by editing the graphics to be edited in the enlargement/reduction area. Thus, the present invention provides the following effects.

1. Since an element in an enlargement/reduction area is automatically enlarged/reduced, no additional operation is required to specify the enlargement/reduction of the element in the enlargement/reduction area.
2. Since a preliminarily specified element is always displayed in the enlargement/reduction area, no scrolling operation is needed in an editing process.
3. Since a preliminarily specified element is always displayed in the enlargement/reduction area, graphics are edited mainly for a desired layout.
4. Since a layout of graphics can be constantly observed, omitted is an additional operation of switching a display screen to a layout screen.
5. Since a layout of graphics can be constantly observed, graphics are edited with an optimum layout appropriately searched for.

What is claimed is:

1. An edit screen display control device comprising:

selecting means for selecting at least one of a plurality of elements on a screen;

display means for displaying the elements selected by said selecting means in an enlargement/reduction area on the screen;

editing means for performing an editing process on an element in the selected elements; and enlargement/reduction control means for controlling the display means to display an enlargement/reduction of the selected elements in the same enlargement/reduction area that the selected elements are displayed based on the editing process performed on the element by said editing means.

2. The edit screen display control device according to claim 1, wherein said enlargement/reduction control means controls said reduction of the selected elements when the edited element overflows the enlargement/reduction area, and controls said enlargement of the selected elements when an empty space is generated around the enlargement/reduction area as a result of the editing process performed on the element.

3. The edit screen display control device according to claim 2, wherein said selecting means determines at least one of leftmost, rightmost, upper limit, and lower limit elements from the elements selected in the enlargement/reduction area;

said enlargement/reduction control means determines whether or not the edited element matches the leftmost, rightmost, upper limit, or lower limit element, controls the enlargement/reduction based on the editing process performed on the element by said editing means, and updates the leftmost, right most, upper limit, and lower limit elements by editing the element.

4. The edit screen display control device according to claim 1, wherein said editing process is performed by said editing means on a single element in the elements selected in the enlargement/reduction area.

5. The edit screen display control device according to claim 1, wherein said editing process is performed by said editing means on a plurality of elements in the elements selected in the enlargement/reduction area.

6. The edit screen display control device according to claim 1, wherein said plurality of elements on the screen include a logic circuit or a line for connecting the logic circuit.

7. The edit screen display control device according to claim 1, wherein said plurality of elements on the screen include a character in a document.

8. The edit screen display control device according to claim 1, wherein said elements selected by said selecting means include elements in a rectangular area defined by start and end points specified by an external input device.

9. The edit screen display control device according to claim 1, wherein said elements selected by said selecting means include elements selected by a clicking using an external input device.

10. The edit screen display control device according to claim 1, wherein said selecting means includes an element newly displayed in the enlargement/reduction area as a result of said reduction of the elements by said enlargement/reduction control means.

11. The edit screen display control device according to claim 1, wherein said selecting means includes an element newly generated by said editing means.

12. An edit screen display control device in a system having a display screen, comprising:

means for specifying an area in the display screen as an enlargement/reduction area;

means for recognizing that an element in the display screen is encompassed by the enlargement/reduction area;

means for monitoring a movement amount of an external input device during an editing operation for controlling an enlargement/reduction of the recognized element in the same enlargement/reduction area encompassing the recognized element; and means for editing the recognized element in a state in which the recognized element can be enlarged/reduced.

\* \* \* \* \*